(12) United States Patent
Akrotirianakis et al.

(10) Patent No.: US 11,443,262 B2
(45) Date of Patent: Sep. 13, 2022

(54) ENERGY EFFICIENT SCHEDULING OF INDUSTRIAL PROCESS BY REDUCING IDLE TIME AND TARDINESS OF JOBS

(71) Applicant: Siemens Aktiengesellschaft, Munich (DE)

(72) Inventors: Ioannis Akrotirianakis, Princeton, NJ (US); Amit Chakraborty, East Windsor, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/755,905

(22) PCT Filed: Oct. 20, 2017

(86) PCT No.: PCT/US2017/057492
§ 371 (c)(1),
(2) Date: Apr. 14, 2020

(87) PCT Pub. No.: WO2019/078875
PCT Pub. Date: Apr. 25, 2019

(65) Prior Publication Data
US 2020/0320456 A1    Oct. 8, 2020

(51) Int. Cl.
*G06Q 10/06*    (2012.01)
*G06Q 10/04*    (2012.01)
(Continued)

(52) U.S. Cl.
CPC ....... *G06Q 10/06316* (2013.01); *G06Q 10/04* (2013.01); *G06Q 10/06313* (2013.01);
(Continued)

(58) Field of Classification Search
None
See application file for complete search history.

(56) References Cited

U.S. PATENT DOCUMENTS

| | | | |
|---|---|---|---|
| 9,625,967 B1 * | 4/2017 | Throop | G06F 1/3203 |
| 10,747,914 B1 * | 8/2020 | Hoff | G06Q 50/06 |

(Continued)

FOREIGN PATENT DOCUMENTS

| | | | |
|---|---|---|---|
| CN | 10367694 A | | 3/2014 |
| CN | 107291537 A | * | 10/2017 |

OTHER PUBLICATIONS

Mittal et al. "A Resolution for Shared Memory Conflict in Multi-processor System-on-a-Chip" (2011) (retrieved from https://arxiv.org/ftp/arxiv/papers/1202/1202.0613.pdf) (Year: 2011).*

(Continued)

*Primary Examiner* — Sujay Koneru (57) ABSTRACT

A computer-implemented method of scheduling jobs for an industrial process includes receiving jobs to be executed on machines within a manufacturing facility. A job schedule is generated based on an optimization function that minimizes total energy cost for all the machines during a time horizon based on a summation of energy cost at each time step between a start time and an end time. The energy cost at each time step is a summation of (a) a first energy cost associated with each machine in sleeping mode during the time step, (b) a second energy cost associated with each machine in stand-by mode during the time step, and (c) a third energy cost associated with each machine in processing mode during the time step. The jobs are executed on the machines based on the job schedule.

22 Claims, 3 Drawing Sheets

(51) Int. Cl.
  *G06Q 50/06* (2012.01)
  *G06Q 50/04* (2012.01)
  *G05B 19/418* (2006.01)

(52) U.S. Cl.
  CPC ............. *G06Q 50/04* (2013.01); *G06Q 50/06* (2013.01); *G05B 19/41865* (2013.01); *G05B 2219/32283* (2013.01)

(56) References Cited

U.S. PATENT DOCUMENTS

| | | | |
|---|---|---|---|
| 2005/0096770 A1* | 5/2005 | Chua | G05B 19/41865 700/102 |
| 2008/0214249 A1* | 9/2008 | Kim | H04B 1/1615 455/574 |
| 2011/0310428 A1 | 12/2011 | Ciriza et al. | |
| 2012/0320410 A1* | 12/2012 | Kakegawa | G06F 3/1285 358/1.15 |
| 2014/0257546 A1* | 9/2014 | Mizutani | G05B 19/41865 700/108 |
| 2014/0298349 A1* | 10/2014 | Jackson | G06F 1/3206 718/104 |
| 2014/0303798 A1* | 10/2014 | Saliba | G06Q 50/06 700/291 |
| 2015/0293785 A1* | 10/2015 | Murphy | G06F 9/5027 718/102 |
| 2016/0132033 A1* | 5/2016 | Kao | G05B 19/048 700/291 |
| 2017/0220016 A1* | 8/2017 | Zhou | G06Q 10/0631 |
| 2018/0175905 A1* | 6/2018 | Nabki | H04L 7/0091 |
| 2018/0260360 A1* | 9/2018 | Samadi | G06F 9/3016 |
| 2019/0141419 A1* | 5/2019 | Xu | H02J 50/00 |
| 2020/0226518 A1* | 7/2020 | Li | G06Q 10/06311 |

OTHER PUBLICATIONS

International Search Report dated Dec. 6, 2017; Application No. PCT/US2017/057492; 11 pages.

\* cited by examiner

Fig. 3

ENERGY EFFICIENT SCHEDULING OF INDUSTRIAL PROCESS BY REDUCING IDLE TIME AND TARDINESS OF JOBS This application is a national phase filing under 35 U.S.C. § 371 of International Patent Application No. PCT/US2017/057492, filed Oct. 20, 2017, which is incorporated herein by reference in its entirety.

TECHNICAL FIELD

The present disclosure relates to an energy efficient scheduling of industrial processes that may be applied to reduce idle time and tardiness of jobs.

BACKGROUND

Energy is one of the most critical resources in the manufacturing industry and its cost contributes significantly to the overall cost of the final product. In the U.S., the manufacturing industry is responsible for using about 33% of the total energy and at the same time contributes approximately 28% of the greenhouse emissions. In China, on the other hand, the energy consumption of the manufacturing sector consumes around 50% of the total electricity produced and generates approximately 26% of the total $CO_2$ emissions. Due to the limited natural resources energy prices are bound to increase in the long term and fluctuate significantly in the short and mid-term. There is, therefore, a great deal of pressure in the manufacturing industry to reduce their energy consumption in order to become more profitable and environmentally friendly.

A majority of the energy consumed in production sites corresponds to operations that are not directly related to the actual production of parts needed by customers. For example, when machines remain idle (i.e., when they do not have any job to process) they are frequently at full operational mode. As a result, idle machines consume a large portion of the total energy required by the manufacturing facility. Reducing idle time is therefore a very important factor that when addressed properly can reduce the total energy consumed and the total carbon emissions produced by manufacturing sites. These reductions must not impact the total production throughput and the satisfaction of the total customer demand.

A large amount of research has been devoted thus far to the area of sustainable manufacturing. The energy consumption for a machine tool in a manufacturing facility can be divided into two main types: (a) the non-processing electricity consumption, and (b) the processing electricity consumption. The former is associated with the time when the machine is idle. During that time the machine may be in several different modes, such as: sleeping, stand-by, start-up, shut-down. In all of these modes the machine consumes different amounts of energy. The least amount of energy is consumed when the machine is in sleeping mode, followed by the stand-by mode. The energy consumed by start-up or shutdown modes varies and some machines may need a substantial amount of energy. The time that a machine can stay in a specific mode is known in advance.

SUMMARY

Embodiments of the present invention address and overcome one or more of the above shortcomings and drawbacks, by providing methods, systems, and apparatuses related to energy efficient scheduling of industrial process by reducing idle time and tardiness of jobs. More specifically, the techniques described herein utilize an optimization model that minimizes total energy cost for all the machines during a time period.

According to some embodiments, computer-implemented method of scheduling jobs for an industrial process includes receiving jobs to be executed on machines within a manufacturing facility. A job schedule is generated based on an optimization function that minimizes total energy cost for all the machines during a time horizon based on a summation of energy cost at each time step between a start time and an end time. The energy cost at each time step is a summation of (a) a first energy cost associated with each machine in sleeping mode during the time step, (b) a second energy cost associated with each machine in stand-by mode during the time step, and (c) a third energy cost associated with each machine in processing mode during the time step. The jobs are then executed on the machines based on the job schedule. In some embodiments, the job scheduling process is continually repeated at predetermined intervals to capture changes with regards to, for example, the availability of machines or changes in the jobs that need to be processed.

In some embodiments of the aforementioned method, one or more constraints are applied to the optimization function while developing the job schedule. These constraints may include, for example, one or more of the following: a constraint requiring that each of the jobs is completed before the end of the time period, a constraint requiring that total energy consumed by executing the job schedule does not exceed than a maximum allowed energy available to the manufacturing facility, and a constraint requiring that, for each job to be started on a particular machine, a previous job executed on the particular machine must be completed. In one embodiment, each job comprises a plurality of operations and the constraints further comprise a constraint requiring that, for each job, the plurality of operations is executed in a predetermined ordering associated with the job. In other embodiment, a constraint requires that, for each machine, an amount of time the machine is in processing mode but does not process any job must be less than a predetermined number. In some embodiments, each job is associated with a due time and the constraints further comprise a constraint requiring that each job must be completed prior to its due time in order to meet the demand of final product. Similarly, in some embodiments, each job is associated with a release time and the constraints comprise a constraint requiring that each job must be completed prior to its release time.

In some embodiments, the aforementioned method further includes detecting that one or more machines in the plurality of machines are unavailable for job execution. In response, the remaining machines that are available for job execution are identified, along with any non-completed jobs. A new job schedule may then be generated for the non-completed jobs based on a new optimization function that minimizes total energy cost for all the remaining machines during a new time period based on a new summation of energy cost at each time step between a new start time and the end time.

According to another aspect of the present invention, as described in various embodiments of the present invention, a system for scheduling jobs for an industrial process includes a computer-readable storage medium and one or more processors. The computer-readable storage medium stores a plurality of jobs to be executed on a plurality of machines within a manufacturing facility. The processors are configured to generate a job schedule based on an optimization function that minimizes total energy cost for all the machines during a time horizon based on a summation of energy cost at each time step between a start time and an end time. Similar to the methods described above, the energy cost at each time step is a summation of (a) a first energy cost associated with each machine in sleeping mode during the time step, (b) a second energy cost associated with each machine in stand-by mode during the time step, and (c) a third energy cost associated with each machine in processing mode during the time step. The system executes the plurality of jobs on the plurality of machines based on the job schedule.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to the energy efficient scheduling of industrial process by reducing idle time and tardiness of jobs. More specifically, the techniques described herein utilize an optimization model that minimizes total energy cost for all the machines during a time period. Due to the large amount of combinations that exist in any manufacturing scheduling problem the model is a Mixed Integer Linear Programming (MILP) problem. These problems are very computationally demanding and belong to the NP-complete class. The main factors that contribute to the efficient solution of such problems are the large number of variables and constraints. The techniques described herein carefully define the least number of variables and constraints in the optimization model. This allows the model to be solved in reasonable computational times. In addition the optimization model described herein is quite general and easily expandable to incorporate additional constraints without increasing very much the computational time required.

Figure 1:
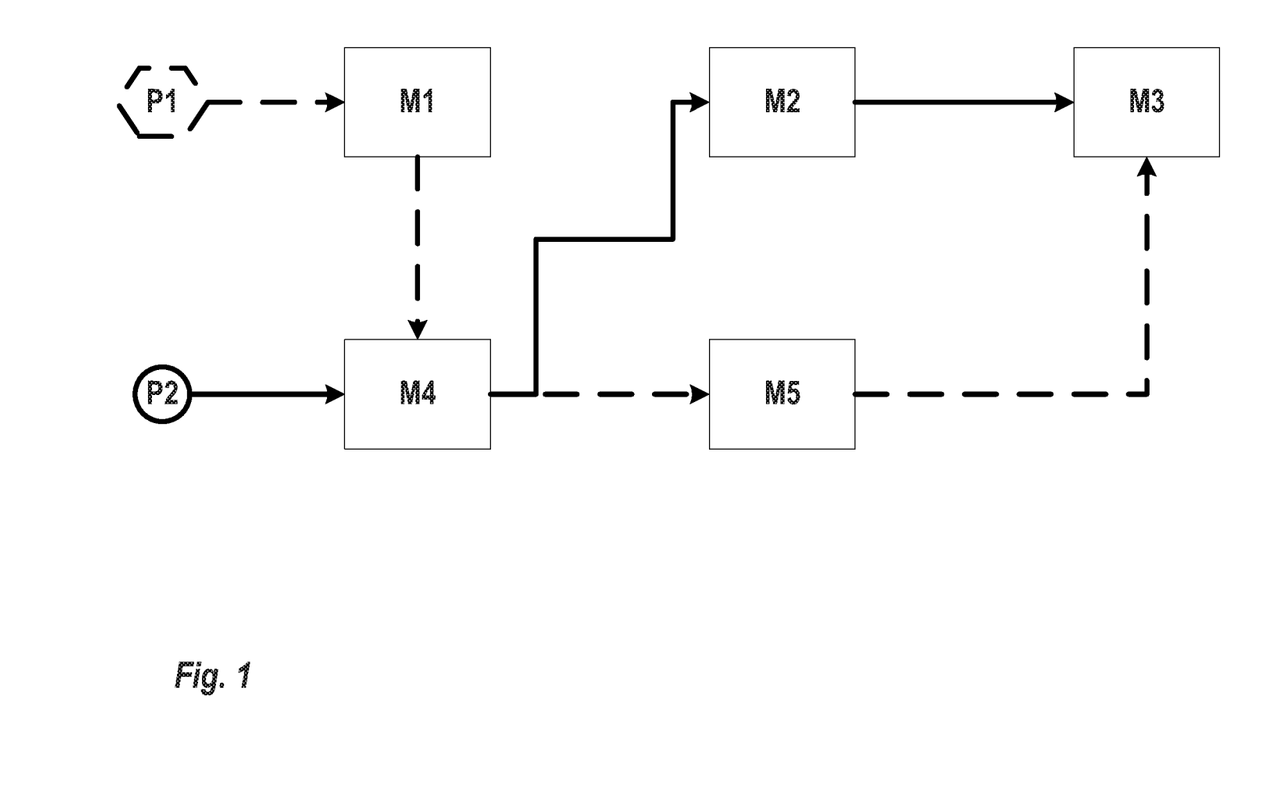
FIG. 1 shows an example job scheduling problem.

FIG. 1 shows an example job scheduling problem. Job shop problems are very common in every manufacturing facility. Each job shop problem comprises a number of jobs that need to be processed by a number of machines. In FIG. 1, there are two main product types, P1 and P2. In order to produce P1, machines M1, M4, M5 and M3 (in that sequence) need to be available to perform the operations needed. Similarly for product P2, machines M4, M2 and M3 must be available.

Each product represents a job. A job comprises a number of operations that can be performed by one or more machines. The machines can perform one or more operations hence they can be used by different jobs as needed. Each machine needs a specific amount of energy to perform an operation. In addition a machine can be in one of the following three modes:

(i) sleeping, (ii) stand-by, and (iii) processing. The energy consumed in each of these modes is different with the lowest in the sleeping mode, followed by the stand-by mode and then by the processing mode which entails the most energy consumption. Hence, a machine that is not producing any value to the manufacturing facility (i.e., does not process any job) should not be in the high energy processing mode, but it should switch to either stand-by mode or sleeping mode. If a machine is not operating on a specific job for a continuous time interval then it will have to switch to the stand-by mode, to save energy. Similarly if a machine is in stand-by mode for a continuous time interval then it should switch to the sleeping mode in order to save more energy.

The time horizon for a job schedule is the estimated time for completing all jobs in the schedule. The time horizon is divided into a plurality of intervals, or time periods. The total energy consumed throughout the time horizon is the sum of the energy consumed by all machines. Since each machine can be in one of the three different modes, the total energy will be the summation of all the energy consumed in each mode that a machine may enter at every time point. Let $q_m^S$, $q_m^B$, and $q_m^P$: represent the energy consumption of machine m while in sleeping mode, stand-by mode, or processing mode, respectively. Additionally, let $y_{it}^P$, $y_{it}^B$, and $y_{it}^S$ be binary variables that indicate whether or not a particular machine is in processing, stand-by, or sleeping mode, respectively. If machine i is in processing mode at time period t (i.e., $y_{it}^P=1$), then it consumes $q_i^P$ units of energy (e.g., kWh). Then, the energy cost at period t is equal to $y_{it}^P q_i^P c_t$, where $c_t$ is the energy cost at time t. Similarly, if machine i is in stand-by mode at time period t (i.e., $y_{it}^B=1$), then it consumes $q_i^B$ units of energy (e.g., kWh) and the energy cost at period t is equal to $y_{it}^B q_i^B c_t$. If machine i is in sleeping mode at time period t (i.e., $y_{it}^S$), then it consumes $q_i^S$ units of energy (e.g., kWh) and the energy cost at period t is equal to $y_{it}^S q_i^S c_t$.

The techniques described herein generate a job schedule based on an optimization function that minimizes total energy cost for all the machines during a time period. Although this optimization may be formulated in various ways, in an exemplary embodiment, the objective function is defined as follows:

$$\min \sum_{i \in M} \sum_{t \in T} y_{it}^P q_i^P c_t + y_{it}^B q_i^B c_t + y_{it}^S q_i^S c_t \qquad (1)$$

Here, M the set of machines (or products that need to be produced). T is the time horizon (i.e., the period during jobs should be completed). The time horizon, starts at a desired start time (e.g., the current time) and extends to the estimated time of completion of all the scheduled jobs. This end time is denoted herein as $\tau$. Note that the cost of energy at every time period may be different. For example, during the summer, the energy between 12 p.m. and 5 p.m. may cost much more than the rest of the day. Equation (1) captures this variability by considering $c_t$ at each time step t. Therefore, model will try to have machines in processing mode during time periods where the energy cost is lower and, if possible, have machines in sleeping or stand-by mode during periods of high energy costs Constraints are applied to the optimization problem defined Equation (1) in various embodiments of the present invention. The constraints may be expressed in terms of inequalities to capture the physical limitations of the scheduling problem. The constraints may be applied individually or in combination to produce the desired restriction on the optimization. Five example constraints are described below; however it should be understood that this list should not be viewed as limiting and additional constraints may be applied as well.

The first constraint is that each job j must be completed on a machine i before the end of the time horizon, that is $$\sum_{t \in T-\{\tau\}} z_{ijt} = 1, \forall i \in M, j \in J \qquad (2)$$

Here $z_{ijt}=1$ if job j starts operation on machine i in period t; otherwise $zi_{jt}=0$. J is the set of jobs (or products that need to be produced). Note that we have excluded the last time period in the time horizon as no job should be allowed to start at the end of the time horizon.

The second constraint is that, for each time period, the total energy consumed should not be more than the maximum allowed energy offered to the manufacturing facility $$\sum_{i \in M} y_{it}^P q_i^P + y_{it}^B q_i^B + y_{it}^S q_i^S \leq q_{max}, \forall t \in T \qquad (3)$$

In Equation (3), $q_{max}$ denotes the maximum energy available for the manufacturing facility at every point in time. This is a parameter value that is primarily fixed based on factors such as energy infrastructure of the facility and the energy availability of the power grid. The value may be manually input by the plant manager or, if $q_{max}$ is stored in any computer readable medium, it may be read automatically by the job scheduling computing system. In some embodiments, the value of $q_{max}$ is periodically verified (e.g., monthly) either by requesting new information from a user or by re-reading the stored value. This allows the job scheduling routing to consider the most up-to-date information regarding power availability.

Operations of a specific job have some predetermined ordering. That is, an operation cannot start on an appropriate machine, if the one preceding it has completed in another appropriate machine. This requirement is expressed by as an inequality in the third constraint:

$$\sum_{t=1}^{r} t z_{ijt} + p_i \geq \sum_{t=1}^{r} t z_{i,j+1,t}, \forall i \in M, j \in J, r \in T \qquad (4)$$

In Equation (4) $p_i$ processing time of machine i and r is the running time (i.e., the time that has elapsed since the start of the time period T). When a new job needs to start on the machine, the job that is currently processed by that machine must be completed. This requirement is represented by an inequality in the fourth constraint:

$$\sum_{t=1}^{r} t z_{ijt} + p_i \geq \sum_{t=1}^{r} t z_{i+1,j,t}, \forall i \in M, j \in J, r \in T \qquad (5)$$

The fifth constraint is the amount of time a machine is in processing mode but does not process any job must be less than a specified number, that is $$\sum_{t=1}^{r} (1 - z_{ijt}) \leq s_i, \forall i \in M, j \in J, r \in T \qquad (6)$$

In Equation (6), $s_i$ is the time needed by machine i to switch from stand-by to sleeping mode. This constraint ensures that the time a machine spends without processing a job is kept under control and a switch to a stand-by of sleeping mode is going to be more beneficial in terms of energy consumption. The value of $s_i$ is a fixed value that may be read by or input into the job scheduling computing system, for example, when a new machine is first introduced into the system. In some embodiments, the job scheduling computing system is configured to communicate with each machine directly to retrieve $s_i$ and other configuration information.

Additional constraints related to the completion, due and release times of a job may be applied in some embodiments. The "due times" are introduced in order to meet the customer demand of the final products whereas the "release times" may be related to the availability of specific materials needed to complete a job. The completion time of job j can be expressed as $$c_j = \sum_{i \in M} \sum_{t \in T} x_{ijt} \qquad (7)$$

Here, $x_{ijt}=1$, if job j is processed on machine i in period t; otherwise $x_{ijt}=0$. The completion time of job j must be less than its due time κ:

$$c_j \leq \kappa_j \qquad (8)$$

The release time ρ of a job is the earliest time when the job can start execution. The release time of a particular job j can be expressed in terms of its processing status. That is, a job j cannot start before its release time:

$$\sum_{t=1}^{\rho_j} x_{ijt} = 0 \qquad (9)$$

The due time or deadline of a job δ is the time when the job must be completed. There should be no processing after the due time of a job. That is:

$$\sum_{t=\delta_j}^{T} x_{ijt} = 0 \qquad (10)$$

The above two constraints reduce the feasible region dramatically, as they set many binary variables associated with the processing status of the jobs to 0.

The tardiness of a job is expressed by the max operator defined as $$\ell_j = \max\{0, c_j - \delta_j\} \qquad (11)$$

That is, the tardiness measures how much later than its due time a job has been completed. If the job was completed on time, then the tardiness is 0, otherwise the tardiness is the difference between the completion time and its due time. It is desirable in industrial facilities to find schedules that reduce the tardiness of the jobs. For this reason, in some embodiments, the optimization function comprises a term that minimizes the tardiness of each job to provide a more flexible objective as follows:

$$\min \sum_{j \in J} \ell_j + \sum_{i \in M} \sum_{t \in T} y_{it}^P q_i^P c_t + y_{it}^B q_i^B c_t + y_{it}^S q_i^S c_t \qquad (12)$$

Equation (12) not only reduces the idle time of machines but it also reduces the tardiness of jobs.

Figure 2:
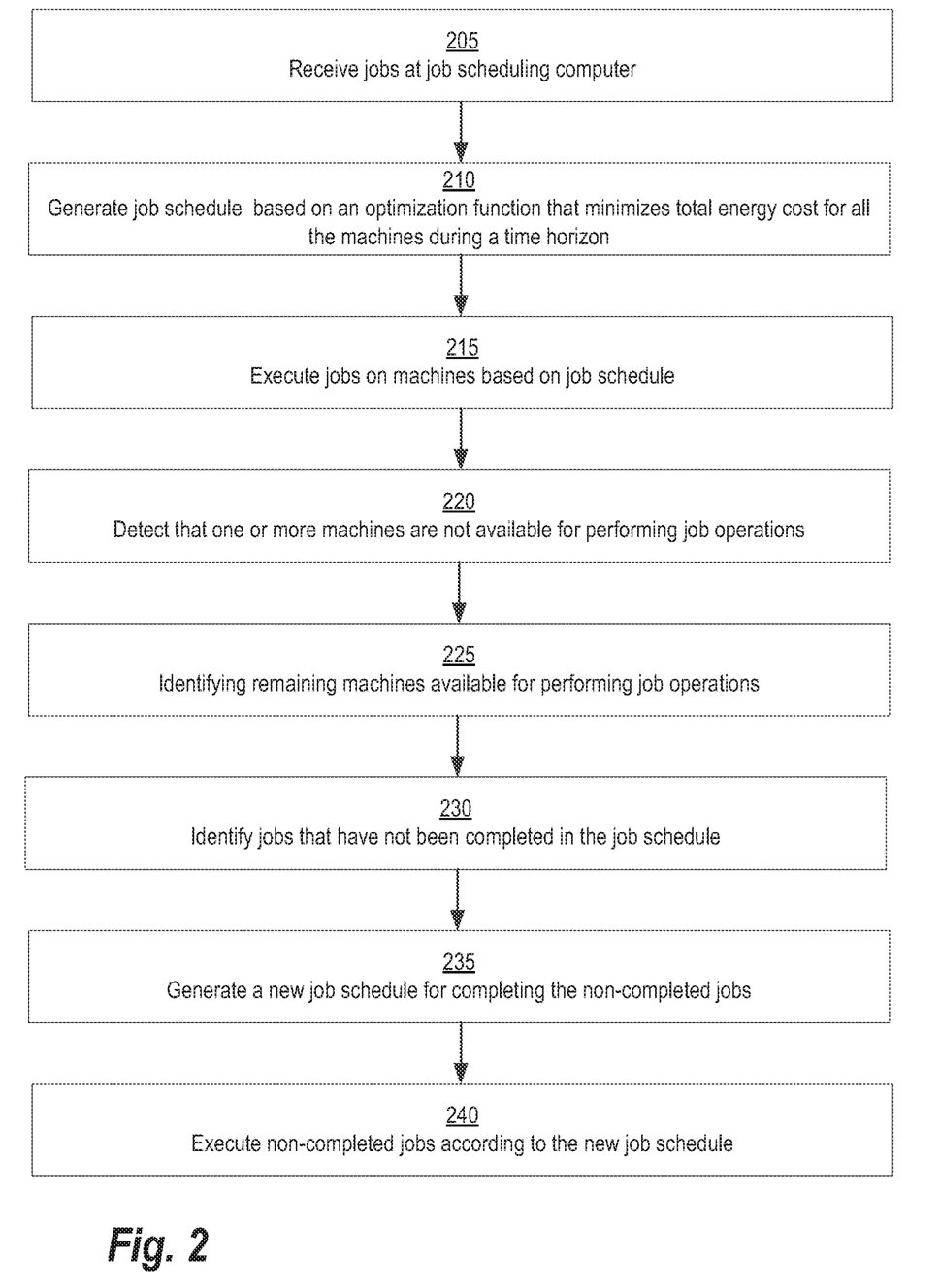
FIG. 2 illustrates a method of scheduling jobs for an industrial process, according to some embodiments.
Figure 3:
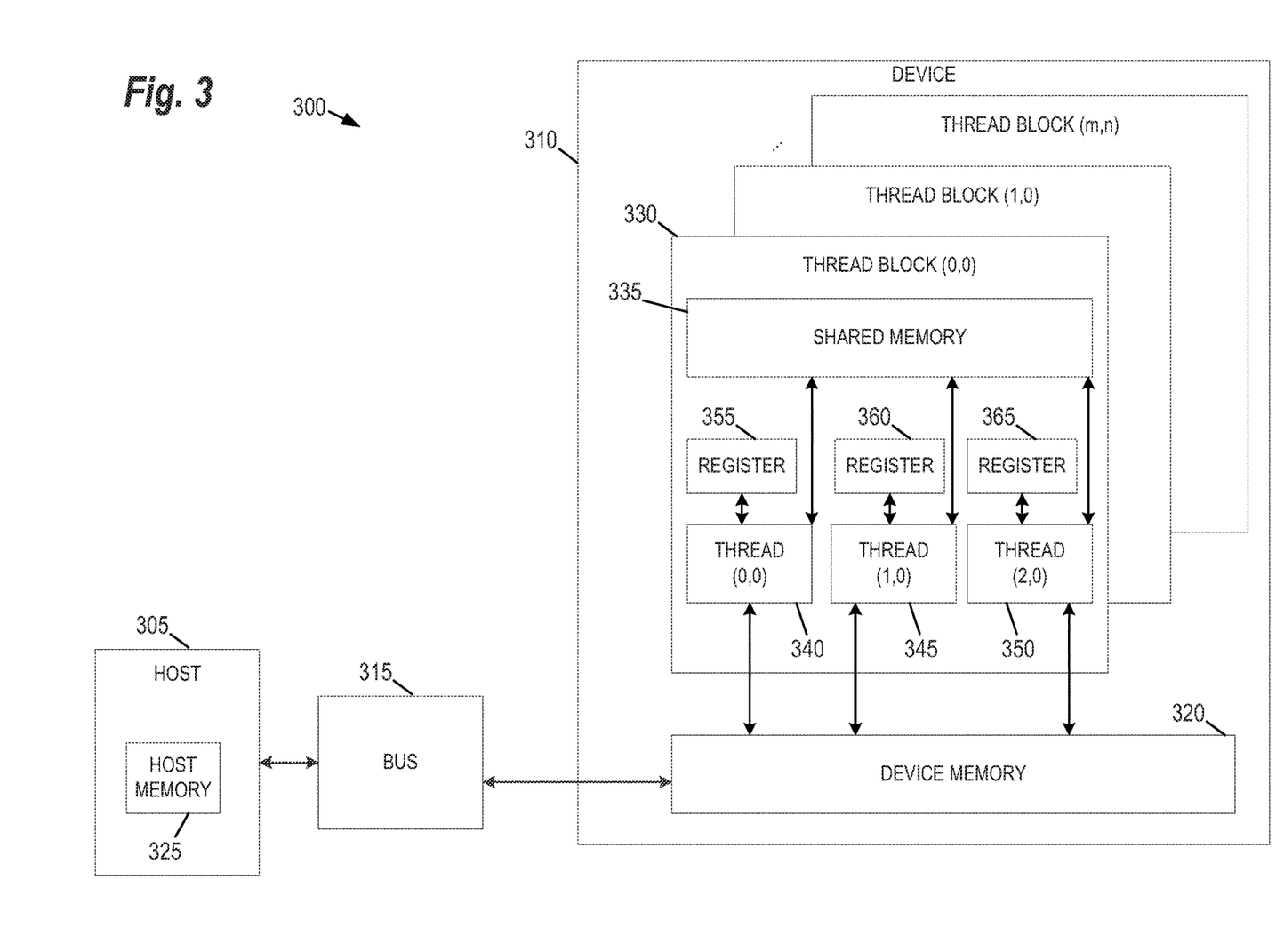
FIG. 3 provides an example of a parallel processing memory architecture that may be utilized by to perform computations related to job scheduling, according to some embodiments of the present invention.

FIG. 2 illustrates a method 200 of scheduling jobs for an industrial process, according to some embodiments. This method 200 may be performed by a dedicated job scheduling computing system within the manufacturing facility, although generally other computing architectures may be employed. For example, in some embodiments, the method 200 may be executed using a cloud-based computing system connected to the manufacturing facility. FIG. 3, described below, provides an additional computing architecture that can be employed in some embodiments for job scheduling.

Continuing with reference to FIG. 2, at step 205, a plurality of jobs is received by the job scheduling computing system. Each job is required to be executed on one or more machines within a manufacturing facility. Jobs may be received in batches or individually. In some embodiments, all jobs are received at once; while, in other embodiments, jobs are continually received during general operation of the facility. Techniques generally known in the art may be employed for entering the jobs into the system. For example, jobs may be automatically created (e.g., based off a purchase order) and entered into the system. Alternatively, a user may manually input jobs.

At step 210, a job schedule is generated using an optimization function that minimizes total energy cost for all the machines during a time horizon based on a summation of energy cost at each time step between a start time and an end time. As described above with respect to Equations (1) and (12), the energy cost at each time step is a summation of (a) a first energy cost associated with each machine in sleeping mode during the time step, (b) a second energy cost associated with each machine in stand-by mode during the time step, and (c) a third energy cost associated with each machine in processing mode during the time step. Additionally, one or more constraints may be applied to the function as described in Equations (2)-(11). The job scheduling computing system minimizes the optimization function using optimization algorithms generally known in the art. Examples of these optimization algorithms include branch and bound methods and branch and cut methods.

At step 215, the jobs are executed on the machines based on the job schedule. Execution of the jobs effectively entails providing executable instructions to one or more machines or other devices to facilitate execution. For example, once the job schedule is developed, the job scheduling computing system may send a first machine instructions for performing operations related to the first job in the schedule. The instructions for performing subsequent operations at other machines may be delivered concurrently with the instructions for the first machine or at a later period of time. For example, in some embodiments, each machine queries the job scheduling computing system for tasking when idle or when a workpiece is received related to a job. In some embodiments, the workpiece itself may be encoded with information (e.g., on a QR sticker) that allows retrieval of job schedule information.

During job execution, various changes in the facility may require adjustment of the job schedule. For example, one or more machines may be required to be shutdown, the machines may fail, or the machines may need to undergo specific maintenance. To accommodate for such changes, steps 220-240 may be optionally performed. At step 220, the job scheduler either detects or receives a notification indicating that one or more machines in the plurality of machines are unavailable for job execution. For example, in one embodiment, a monitoring system may send a message to the job scheduling computing system indicating that a machine is unavailable. Once the job scheduling computing system detects that the machine is unavailable, at step 225, the system identifies remaining machines that are available for job execution. Additionally, at step 230, the system identifies the jobs that have not been completed in the schedule. A new job schedule is generated at step 235 using the techniques described above with respect to step 210. Finally, at step 240, the non-completed jobs are executed on the remaining machines based on the new job schedule.

FIG. 3 provides an example of a parallel processing memory architecture 300 that may be utilized by to perform computations related to job scheduling, according to some embodiments of the present invention. Such architectures are useful because of their extensive computational power and ability to solve large-scale optimization problems. This architecture 300 may be used in embodiments of the present invention where NVIDIA™ CUDA (or a similar parallel computing platform) is used. The architecture includes a host computing unit ("host") 305 and a GPU device ("device") 310 connected via a bus 315 (e.g., a PCIe bus). The host 305 includes the central processing unit, or "CPU," (not shown in FIG. 3) and host memory 325 accessible to the CPU. The device 310 includes the graphics processing unit (GPU) and its associated memory 320, referred to herein as device memory. The device memory 320 may include various types of memory, each optimized for different memory usages. For example, in some embodiments, the device memory includes global memory, constant memory, and texture memory.

Parallel portions of a job scheduling application may be executed on the architecture 300 as "device kernels" or simply "kernels." A kernel comprises parameterized code configured to perform a particular function. The parallel computing platform is configured to execute these kernels in an optimal manner across the architecture 300 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 300 of FIG. 3 (or similar architectures) may be used to parallelize the optimization function such that various operations performed with solving the system are done in parallel. For example, multiple time steps may be processed in parallel (e.g., allowing parallelization of the inner summation of Equation (1)) or multiple machines may be processed in parallel (e.g., allowing parallelization of the outer summation of Equation (1)). In some embodiments different combinations of jobs are evaluated in parallel to allow the optimization model to select the optimal sequence for job execution.

The device 310 includes one or more thread blocks 330 which represent the computation unit of the device 310. The term thread block refers to a group of threads that can cooperate via shared memory and synchronize their execution to coordinate memory accesses. For example, in FIG. 3, threads 340, 345 and 350 operate in thread block 330 and access shared memory 335. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 3, the thread blocks 330 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of different jobs may be automatically partitioned over thread blocks automatically by the parallel computing platform software. However, in other embodiments, the individual thread blocks can be selected and configured to optimize job scheduling. For example, in one embodiment, each thread block is assigned neighboring machines (e.g., those that are typically utilized sequentially during job processing).

Continuing with reference to FIG. 3, registers 355, 360, and 365 represent the fast memory available to thread block 330. Each register is only accessible by a single thread. Thus, for example, register 355 may only be accessed by thread 340. Conversely, shared memory is allocated per thread block, so all threads in the block have access to the same shared memory. Thus, shared memory 335 is designed to be accessed, in parallel, by each thread 340, 345, and 350 in thread block 330. Threads can access data in shared memory 335 loaded from device memory 320 by other threads within the same thread block (e.g., thread block 330). The device memory 320 is accessed by all blocks of the grid and may be implemented using, for example, Dynamic Random-Access Memory (DRAM).

Each thread can have one or more levels of memory access. For example, in the architecture 300 of FIG. 3, each thread may have three levels of memory access. First, each thread 340, 345, 350, can read and write to its corresponding registers 355, 360, and 365. Registers provide the fastest memory access to threads because there are no synchronization issues and the register is generally located close to a multiprocessor executing the thread. Second, each thread 340, 345, 350 in thread block 330, may read and write data to the shared memory 335 corresponding to that block 330. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 310 to read and/or write to the device memory. Device memory requires the longest time to access because access must be synchronized across the thread blocks operating on the device. Thus, in some embodiments, the processing of each time point and/or machine in the optimization function is coded such that it primarily utilizes registers and shared memory and only utilizes device memory as necessary to move data in and out of a thread block for performing the overall summation.

The embodiments of the present disclosure may be implemented with any combination of hardware and software. For example, aside from parallel processing architecture presented in FIG. 3, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method of scheduling jobs for an industrial
process, the method comprising:
receiving a plurality of jobs to be executed on a plurality machines within a manufacturing facility;
generating a job schedule based on an optimization function that minimizes total energy cost for all the machines during a time horizon based on a summation of energy cost at each time step between a start time and an end time, wherein the energy cost at each time step is a summation of
(a) a first energy cost associated with each machine in sleeping mode during the time step,
(b) a second energy cost associated with each machine in stand-by mode during the time step, and
(c) a third energy cost associated with each machine in processing mode during the time step;
wherein one or more scheduling constraints are applied to the optimization function to maximize energy efficiency;
wherein the optimization function is parallelized to perform operations in parallel, comprising:
mapping a computation or a series of computations of the optimization function onto a grid structure, each grid structure containing multiple thread blocks and each thread block containing multiple threads, wherein thread blocks are selected and configured to optimize job scheduling, wherein each thread has one or more levels of memory access including at least one of: a register assigned to a particular thread, a shared memory shared by threads of a thread block, and a device memory shared by all thread blocks, wherein the optimization function is coded to optimize utilization of memory access to primarily utilize the register and the shared memory and to limit device memory utilization to move data in and out of a thread block; and
executing the plurality of jobs on the plurality of machines based on the job schedule.

2. The method of claim 1, wherein the constraints comprise:
a first constraint requiring that each of the jobs is completed before the end of the time horizon.

3. The method of claim 2, wherein the constraints further comprise:
a second constraint requiring that total energy consumed by executing the job schedule does not exceed than a maximum allowed energy available to the manufacturing facility.

4. The method of claim 2, wherein each job comprises a plurality of operations and the constraints further comprise:
a second constraint requiring that, for each job, the plurality of operations is executed in a predetermined ordering associated with the job.

5. The method of claim 2, wherein the constraints further comprise:
a second constraint requiring that, for each job to be started on a particular machine, a previous job executed on the particular machine must be completed.

6. The method of claim 2, wherein the constraints further comprise:
a second constraint requiring, for each machine, a time limit for switching from stand-by mode to sleeping mode.

7. The method of claim 2, wherein each job is associated with a due time and the constraints further comprise:
a second constraint requiring that, for each job, the job must be completed prior to its due time in order to meet the demand of the final product.

8. The method of claim 2, wherein each job is associated with a release time and the constraints further comprise:
a second constraint requiring that, for each job, the job cannot start prior to its release time.

9. The method of claim 1, wherein the optimization function comprises a term that minimizes tardiness of each job.

10. The method of claim 1, further comprising:
detecting that one or more machines in the plurality of machines are unavailable for job execution;
identifying remaining machines in the plurality of machines that are available for job execution;
identifying a plurality of non-completed jobs in the plurality of jobs;
generating a new job schedule for the non-completed jobs based on a new optimization function that minimizes total energy cost for all the remaining machines during a new time horizon based on a new summation of energy cost at each time step between a new start time and the end time, wherein the energy cost at each time step is a summation of
(a) a new first energy cost associated with each remaining machine in sleeping mode during the time step,
(b) a new second energy cost associated with each remaining machine in stand-by mode during the time step, and
(c) a new third energy cost associated with each remaining machine in processing mode during the time step; and
executing the non-completed jobs on the plurality of remaining machines based on the new job schedule.

11. The method of claim 1, wherein the optimization function includes branch and bound methods.

12. The method of claim 1, wherein the optimization function includes branch and cut methods.

13. A computer-implemented method of scheduling jobs in an industrial process, the method comprising:
scheduling, by a computing system, a plurality of jobs using a job scheduling process continually executed at predetermined intervals, the job scheduling process comprising:
identifying one or more jobs to be executed on a plurality available machines within a manufacturing facility;
generating a job schedule based on an optimization function that minimizes total energy cost for all the available machines during a time horizon based on a summation of energy cost at each time step between a start time and an end time, wherein the energy cost at each time step is a summation of
(a) a first energy cost associated with each available machine in sleeping mode during the time step, (b) a second energy cost associated with each available machine in stand-by mode during the time step, and (c) a third energy cost associated with each available machine in processing mode during the time step;

wherein one or more scheduling constraints are applied to the optimization function to maximize energy efficiency wherein the optimization function is parallelized to perform operations in parallel, comprising:

mapping a computation or a series of computations of the optimization function onto a grid structure, each grid structure containing multiple thread blocks and each thread block containing multiple threads, wherein thread blocks are selected and configured to optimize job scheduling, wherein each thread has one or more levels of memory access including at least one of: a register assigned to a particular thread, a shared memory shared by threads of a thread block, and a device memory shared by all thread blocks, wherein the optimization function is coded to optimize utilization of memory access to primarily utilize the register and the shared memory and to limit device memory utilization to move data in and out of a thread block; and executing the plurality of jobs on the plurality of available machines based on the job schedule.

14. The method of claim 13, wherein the job scheduling process is only executed if one or more new jobs have been received by the computing system since a last execution of the job scheduling process.

15. The method of claim 13, wherein the constraints comprise:

a first constraint requiring that each of the jobs is completed before the end of the time horizon.

16. The method of claim 15, wherein the constraints further comprise:

a second constraint requiring that total energy consumed by executing the job schedule does not exceed than a maximum allowed energy available to the manufacturing facility.

17. The method of claim 15, wherein each job comprises a plurality of operations and the constraints further comprise:

a second constraint requiring that, for each job, the plurality of operations is executed in a predetermined ordering associated with the job.

18. The method of claim 15, wherein the constraints further comprise:

a second constraint requiring that, for each job to be started on a particular machine, a previous job executed on the particular machine must be completed.

19. The method of claim 15, wherein the constraints further comprise:

a second constraint requiring, for each machine, a time limit for switching from stand-by mode to sleeping mode.

20. The method of claim 15, wherein each job is associated with a due time and a release time and the constraints further comprise:

a second constraint requiring that, for each job, the job must be completed prior to its due time in order to meet the demand of the final product; and a third constraint requiring that, for each job, the job cannot start prior to its release time.

21. The method of claim 13, wherein the optimization function comprises a term that minimizes tardiness of each job.

22. A system for scheduling jobs for an industrial process, the system comprising:

a computer-readable storage medium storing a plurality of jobs to be executed on a plurality machines within a manufacturing facility;

one or more processors configured to:

generate a job schedule based on an optimization function that minimizes total energy cost for all the machines during a time horizon based on a summation of energy cost at each time step between a start time and an end time, wherein the energy cost at each time step is a summation of:

(a) a first energy cost associated with each machine in sleeping mode during the time step, (b) a second energy cost associated with each machine in stand-by mode during the time step, and (c) a third energy cost associated with each machine in processing mode during the time step;

wherein one or more scheduling constraints are applied to the optimization function to maximize energy efficiency;

wherein the optimization function is parallelized to perform operations in parallel, comprising:

mapping a computation or a series of computations of the optimization function onto a grid structure, each grid structure containing multiple thread blocks and each thread block containing multiple threads, wherein thread blocks are selected and configured to optimize job scheduling, wherein each thread has one or more levels of memory access including at least one of: a register assigned to a particular thread, a shared memory shared by threads of a thread block, and a device memory shared by all thread blocks, wherein the optimization function is coded to optimize utilization of memory access to primarily utilize the register and the shared memory and to limit device memory utilization to move data in and out of a thread block; and execute the plurality of jobs on the plurality of machines based on the job schedule.

* * * * *